US009114957B2

(12) United States Patent
Teramoto

(10) Patent No.: US 9,114,957 B2
(45) Date of Patent: Aug. 25, 2015

(54) ACCELERATION AND DECELERATION HANDRAIL DRIVING DEVICE

(71) Applicant: Katsuya Teramoto, Numazu (JP)

(72) Inventor: Katsuya Teramoto, Numazu (JP)

( * ) Notice: Subject to any disclaimer, the term of this patent is extended or adjusted under 35 U.S.C. 154(b) by 0 days.

(21) Appl. No.: 14/334,666

(22) Filed: Jul. 18, 2014

(65) Prior Publication Data

US 2015/0008095 A1 Jan. 8, 2015

Related U.S. Application Data

(63) Continuation of application No. PCT/JP2012/051014, filed on Jan. 19, 2012.

(51) Int. Cl.
*B65G 23/24* (2006.01)
*B66B 23/04* (2006.01)
*B66B 23/26* (2006.01)
*B66B 23/24* (2006.01)

(52) U.S. Cl.
CPC ................. *B66B 23/04* (2013.01); *B66B 23/24* (2013.01); *B66B 23/26* (2013.01)

(58) Field of Classification Search
CPC .......... B66B 23/04; B66B 23/24; B66B 23/26
USPC .......................................................... 198/338
See application file for complete search history.

(56) References Cited

U.S. PATENT DOCUMENTS 3,712,448 A * 1/1973 Burson et al. ................. 198/334
3,842,961 A * 10/1974 Burson ......................... 198/334
3,874,297 A * 4/1975 Kondo et al. ................... 104/25
3,884,152 A * 5/1975 Emeriat .......................... 104/25
3,903,806 A * 9/1975 Ayres et al. ...................... 104/25
4,053,044 A * 10/1977 Patin ............................. 198/334
4,240,537 A * 12/1980 Dunstan ........................ 198/334
4,284,191 A * 8/1981 Lavau ........................... 198/792

(Continued)

FOREIGN PATENT DOCUMENTS

JP 2000-318961 A 11/2000
JP 2001-322788 A 11/2001

(Continued)

OTHER PUBLICATIONS

International Search Report for PCT/JP2012/051014 dated Jun. 5, 2012.

*Primary Examiner* — William R Harp
(74) *Attorney, Agent, or Firm* — Yokoi & Co., U.S.A.; Toshiyuki Yokoi

(57) ABSTRACT

Disk-shaped pulleys 6 arranged on entrance side IN and exit side OUT and rotated around a horizontal axis, an expansion link chain 8 endlessly wound between the disk-shaped pulleys, and a flexible handrail belt member 10 connected outside the expansion link chain and extendable/retractable in a traveling direction are provided. The expansion link chain comprises expansion links 82 connected in series. The expansion link is flexibly extendable/retractable in length direction and has a pivot 84. An acceleration/deceleration device 12 accelerates/decelerates the pivot, and has a first track chain 122 endlessly guided along a predetermined first track and a first pressing fitting 128 having a rod shape extending outwards swingably attached to the first track chain. A tip of the first pressing fitting is detachably engaged with the pivot to accelerate/decelerate the pivot by continuously changing distance between the pivots by change of swing angle of the first pressing fitting.

6 Claims, 11 Drawing Sheets

(56) References Cited

U.S. PATENT DOCUMENTS

| | | | | | |
|---|---|---|---|---|---|
| 5,571,254 | A | * | 11/1996 | Saeki et al. | 198/334 |
| 6,138,816 | A | * | 10/2000 | Sato et al. | 198/334 |
| 6,367,608 | B1 | * | 4/2002 | Franceschi | 198/335 |
| 6,832,678 | B2 | * | 12/2004 | Ogura et al. | 198/322 |
| 7,063,203 | B2 | * | 6/2006 | Gonzalez Alemany et al. | 198/334 |
| 7,581,637 | B2 | * | 9/2009 | Lenherr et al. | 198/728 |
| 8,739,957 | B2 | * | 6/2014 | Teramoto | 198/334 |

FOREIGN PATENT DOCUMENTS

| | | | |
|---|---|---|---|
| JP | 2002-326780 | A | 11/2002 |
| JP | 2003-063767 | A | 3/2003 |
| JP | 2003-226480 | A | 8/2003 |
| JP | 2006-199454 | A | 8/2006 |
| JP | 2010-023965 | A | 2/2010 |
| JP | 2010-241542 | A | 10/2010 |
| WO | 2011/138844 | A | 11/2011 |

* cited by examiner

ACCELERATION AND DECELERATION HANDRAIL DRIVING DEVICE

CROSS-REFERENCES TO RELATED APPLICATIONS

This application claims the benefit of priority and is a Continuation application of the prior International Patent Application No. PCT/JP2012/051014, with an international filing date of Jan. 19, 2014, which designated the United States, the entire disclosures of all applications are expressly incorporated by reference in their entirety herein.

BACKGROUND OF THE INVENTION

1. Field of the Invention

The present invention relates to an acceleration and deceleration handrail driving device for an acceleration and deceleration escalator of which a moving speed is slow at a platform and is able to be accelerated or decelerated at an intermediate portion.

2. Description of Related Art

In the existing escalator, the moving speed of a stair (step) on which a person gets is constant and the maximum moving speed of the step is limited due to a slope. For this reason, the moving speed of the escalator is set to the generally allowed maximum speed. Thus, aged persons or children may accidentally fall at the platform (entrance and exit) when getting on or out the platform.

Therefore, it is proposed that an acceleration and deceleration escalator of which the moving speed at the platform is slow and is accelerated or decelerated at the intermediate portion (for example, shown in Patent documents 1 and 2).

Meanwhile, it is used that a "variable speed type moving sidewalk" which moves slowly at the entrance, is accelerated and maintains a high speed at an intermediate portion, and is decelerated and moves slowly again at the exit. In such a variable speed type moving sidewalk, a speed of a handrail for a walker should be increased, maintained and decreased in synchronization with a step surface of the moving sidewalk. As for a handrail device for the variable speed type moving sidewalk, Patent documents 3 to 8 have been proposed.

Patent document 1: Japanese Patent Application Laid-Open No. 2002-326780, "VARIABLE SPEED ESCALATOR"

Patent document 2: International Patent Publication No. WO2011/138844A1, "ACCELERATION DEVICE, AND ACCELERATING ESCALATOR PROVIDED WITH SAME"

Patent document 3: Japanese Patent Application Laid-Open No. 2000-318961, "HANDRAIL FOR ACCELERATION/DECELERATION TYPE MOVING SIDEWALK"

Patent document 4: Japanese Patent Application Laid-Open No. 2001-322788, "MOVING WALK OF VARIABLE SPEED TYPE AND ITS HANDRAIL"

Patent document 5: Japanese Patent Application Laid-Open No. 2003-063767, "RAIL DEVICE OF MOVING WALK"

Patent document 6: Japanese Patent Application Laid-Open No. 2003-226480, "HANDRAIL DEVICE OF VARIABLE SPEED MOVING SIDEWALK"

Patent document 7: Japanese Patent Application Laid-Open No. 2010-023965, "HANDRAIL DEVICE OF VARIABLE SPEED MOVING SIDEWALK"

Patent document 8: Japanese Patent Application Laid-Open No. 2010-241542, "HANDRAIL DEVICE FOR VARIABLE SPEED MOVING SIDEWALK"

BRIEF SUMMARY OF THE INVENTION

In the acceleration and deceleration device of Patent document 2, since a slide pressing fitting is also extended above a pallet, a large space is needed above the pallet. Nevertheless, if the acceleration device of Patent document 2 is used for the handrail of the acceleration and deceleration escalator, a tip of the slide pressing fitting is projected above the handrail, and the acceleration device cannot be used as a handrail. Therefore, the acceleration device of Patent document 2 cannot be used as a handrail of the acceleration and deceleration escalator.

In addition, in the above described handrail devices, many units having different speeds are arranged in stages. Therefore, there is a problem that the walker might be strongly shocked from the handrail in addition to a shock from the step surface at a handrail connection portion where the speed suddenly changes. In order to avoid the shock from the handrail, the walker should move a hand away from the handrail once and hold the handrail again at the handrail connection portion. Thus, the walker should be nervous all the time when using the moving sidewalk. If the walker does not move a hand away from the handrail at the handrail connection portion, a soft grove or a cuff might be involved in the handrail connection portion.

Therefore, the inventor of the present invention formerly invented Patent document 7 and filed a patent application.

The handrail device of Patent document 7 can be continuously accelerated or decelerated without a shock, does not force the walker to change hands holding the handrail from the entrance to the exit, and has no risk of involving the soft grove or the cuff in a mechanism.

However, in the handrail device of Patent document 7, a gripping part, which is directly held by users when using the variable speed moving sidewalk, is rod-shaped members positioned at an interval in a moving direction. Since the users can hold only the rod-shaped members, there is a problem that the user may feel uncomfortable compared to the handrail of a conventional moving sidewalk which is not variable speed. Thus, the handrail device of Patent document 7 is difficult to use.

Therefore, the inventor of the present invention formerly invented Patent document 8 and filed a patent application.

Since the handrail device of Patent document 8 can be applied to the variable speed moving sidewalk having a horizontal plate and a shape of a belt of the handrail device is maintained to be a flat plane as a whole, the user does not feel uncomfortable compared to the handrail of a conventional moving sidewalk which is not variable speed. Therefore, the handrail device of Patent document 8 is easy to use.

However, in the handrail device of Patent document 8, a flexible handrail belt member, which forms the shape of the belt to be the flat plane as a whole, has a problem that a load is applied to an overhanging part of a flexible handrail flat plate member because the overhanging portion located at both sides in a width direction of the flexible handrail flat plate member is curved downward at an initial speed range, an acceleration range and a high-speed range, which are ranges the user grasps the handrail device, and a tip portion of the overhanging portion located at both sides in the width direction of the flexible handrail flat plate member is returned from the downward (inward) to an upward at an exit side of the variable speed moving sidewalk.

In addition, in the acceleration and deceleration escalator, unlike the variable speed moving sidewalk, a speed of the handrail should be increased, maintained or decreased on a curved track in synchronization with a step surface of the moving sidewalk. However, in the above described conventional handrail device for the variable speed moving sidewalk (hereafter referred to merely as "handrail device") has a structure corresponding to a linear track and therefore the handrail device couldn't be used for the curved track required for the handrail for the escalator.

The present invention is invented for solving the above described problems. In other words, an aim of the present invention is to provide an acceleration and deceleration handrail driving device that can be applied to the acceleration and deceleration escalator whose speed is increased, maintained, or decreased on the curved track, can be continuously accelerated or decelerated without a shock, and does not force the walker to change hands holding the handrail from the entrance to the exit.

According to the present invention, there is provided an acceleration and deceleration handrail driving device in which a looped handrail is endlessly wound between an entrance side and an exit side so that the handrail is driven in a predetermined direction including: pulleys arranged on each of the entrance side and the exit side; a looped expansion link chain that is wound between the pulleys of the entrance side and the exit side and formed by connecting a plurality of expansion links, which are flexibly extendable and retractable within a predetermined range in a length direction; and a handrail belt member that is connected with the expansion link chain and continuously extendable and retractable in the length direction of the expansion link chain; wherein the expansion links of the expansion link chain have a first concavo-convex engagement member which is engageable and releasable with a second concavo-convex engagement member by approaching and separating to/from the second concavo-convex engagement member in a direction substantially perpendicular to the length direction, an acceleration and deceleration device is provided so as to accelerate and decelerate the expansion link chain along the length direction of the expansion link chain via the second concavo-convex engagement member, the acceleration and deceleration device has: a first track chain that is driven at a constant speed along a first track, which follows substantially same trajectory as the expansion link chain in a predetermined section of the expansion link chain while being spaced a constant distance from the expansion link chain; and a first pressing fitting that has the second concavo-convex engagement member at one end and is swingably attached to the first track chain at other end, and the first pressing fitting is swung in a predetermined direction within a predetermined angle range when the other end of the first pressing fitting is driven by the first track chain at the constant speed, and the second concavo-convex engagement member drives the expansion link chain via the first concavo-convex engagement member at a moving speed of the second concavo-convex engagement member from when the second concavo-convex engagement member is engaged with the first concavo-convex engagement member by following an arc trajectory to approach to the expansion link chain until the second concavo-convex engagement member is released from the expansion link chain by further following the arc trajectory to separate from the expansion link chain.

According to the above described configuration of the present invention, the first concavo-convex engagement member is accelerated and decelerated by continuously changing the distance between the neighboring first concavo-convex engagement members by the change of the swing angle of the first pressing fitting with respect to the first concavo-convex engagement member, and therefore the first pressing fitting is rotated along the first track while changing the swing angle with respect to the first concavo-convex engagement member so as to continuously change the distance between the first concavo-convex engagement members, and the expansion link chain can be continuously accelerated and decelerated in the traveling direction without a shock.

In addition, since the acceleration and deceleration device is provided to accelerate and decelerate the first concavo-convex engagement member, the present invention can be applied to the acceleration and deceleration escalator.

Furthermore, since the acceleration and deceleration device continuously changes the distance between the first concavo-convex engagement members by accelerating and decelerating the first concavo-convex engagement member by the change of the swing angle of the inclination of the first pressing fitting with respect to the first concavo-convex engagement member, the present invention can be also used for the curved track.

DETAILED DESCRIPTION OF THE INVENTION

Figure 1A:
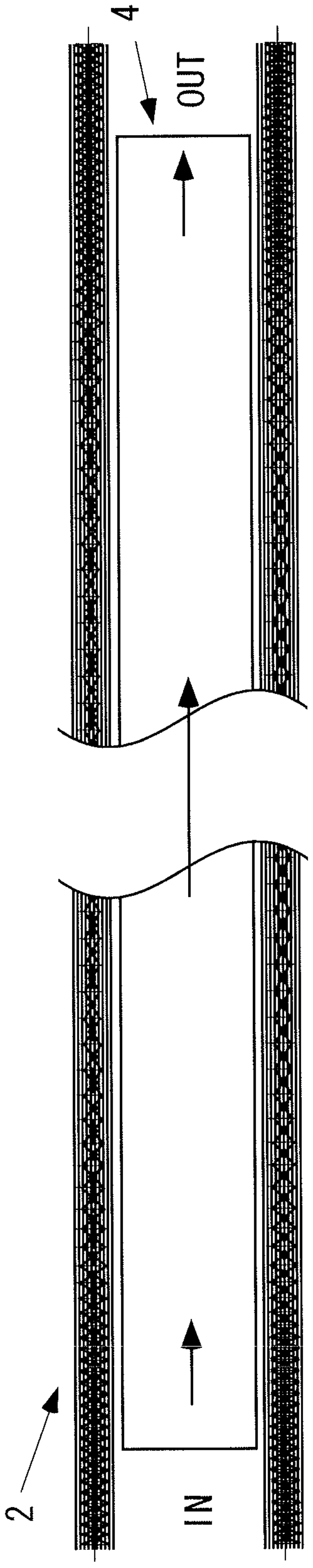
FIG. 1A is a plan view of whole of an acceleration and deceleration handrail driving device of the present invention.
Figure 1B:
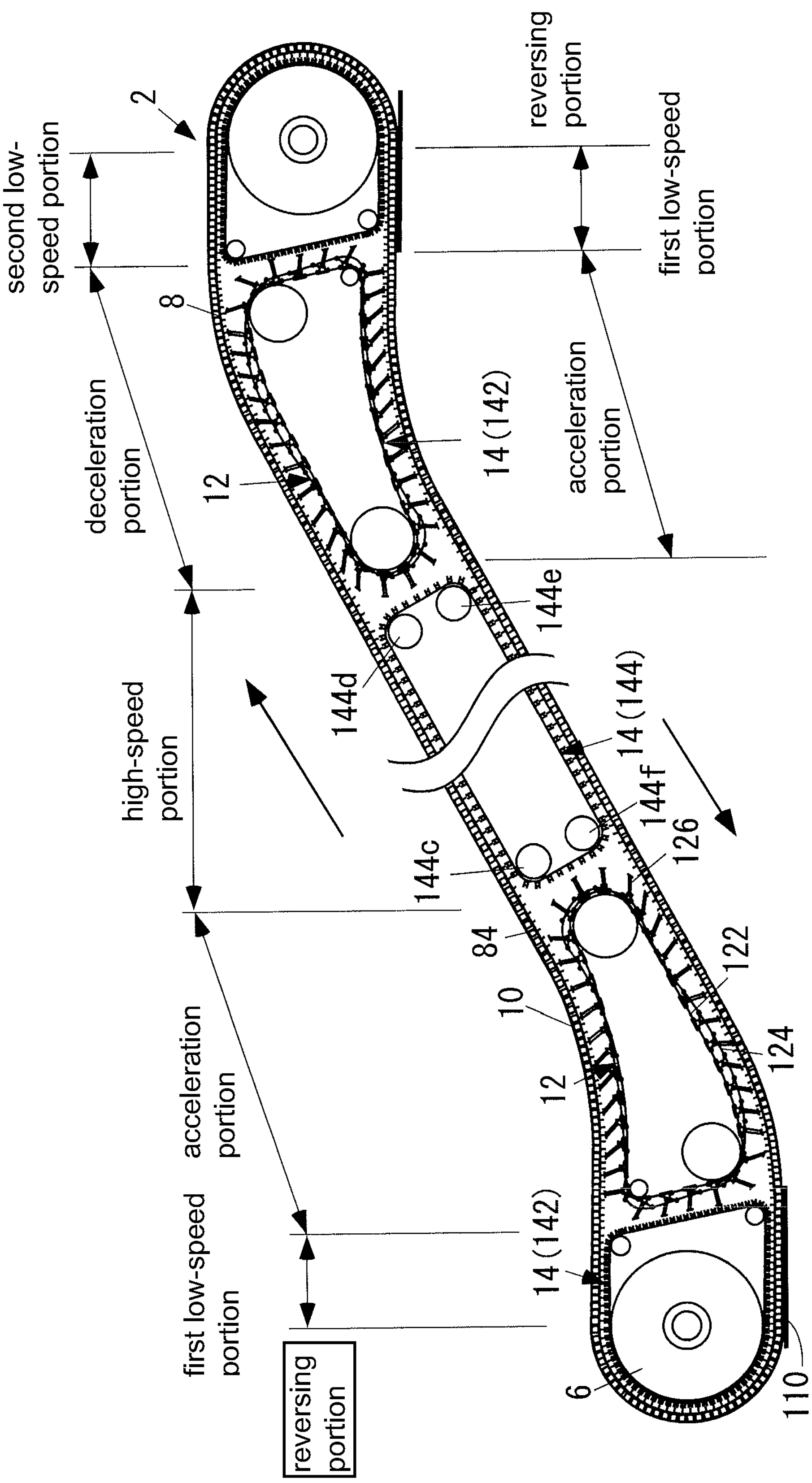
FIG. 1B is a side view of whole of the acceleration and deceleration handrail driving device of the present invention.

FIG. 1A is a plan view of whole of an acceleration and deceleration handrail driving device 2 of the present invention. FIG. 1B is a side view of whole of the acceleration and deceleration handrail driving device 2 of the present invention. As shown in FIG. 1A, a pair of the acceleration and deceleration handrail driving devices 2 (hereafter referred to as merely "handrail device 2") are symmetrically provided on both sides (in a vertical direction in the figure) of an acceleration and deceleration escalator 4.

Figure 2A:
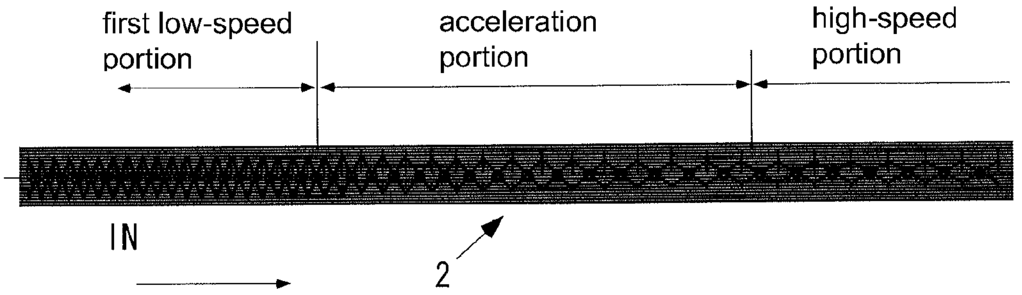
FIG. 2A is a plan view of a detail of the acceleration and deceleration handrail driving device of the present invention.
Figure 2B:
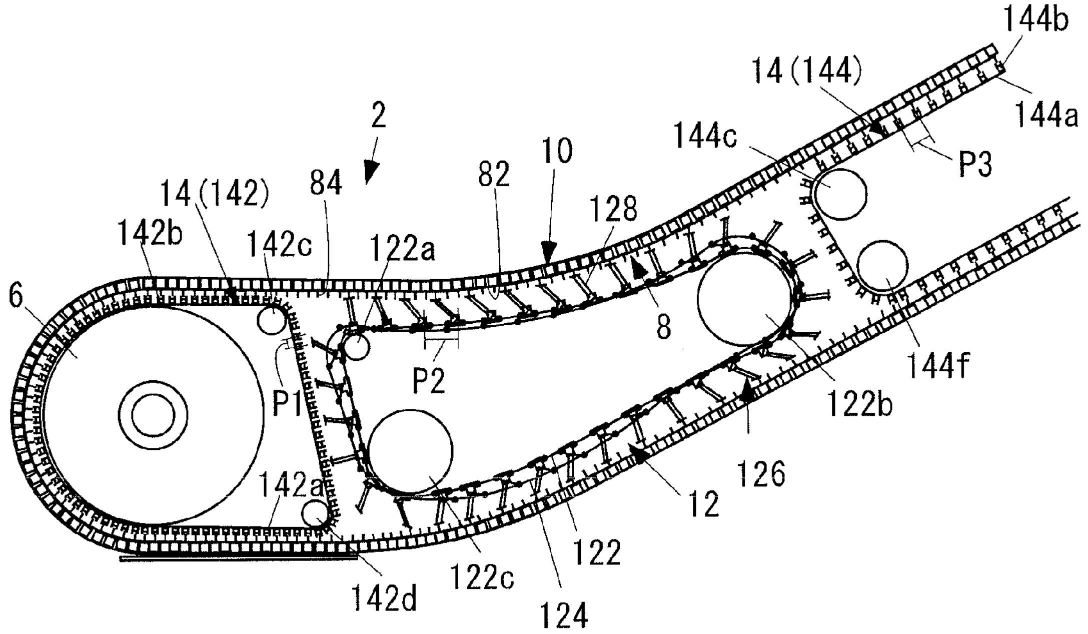
FIG. 2B is a side view of a detail of the acceleration and deceleration handrail driving device of the present invention.

FIG. 2A is a plan view of a detail of the acceleration and deceleration handrail driving device 2 of the present invention. FIG. 2B is a side view of a detail of the acceleration and deceleration handrail driving device 2 of the present invention.

Figure 3:
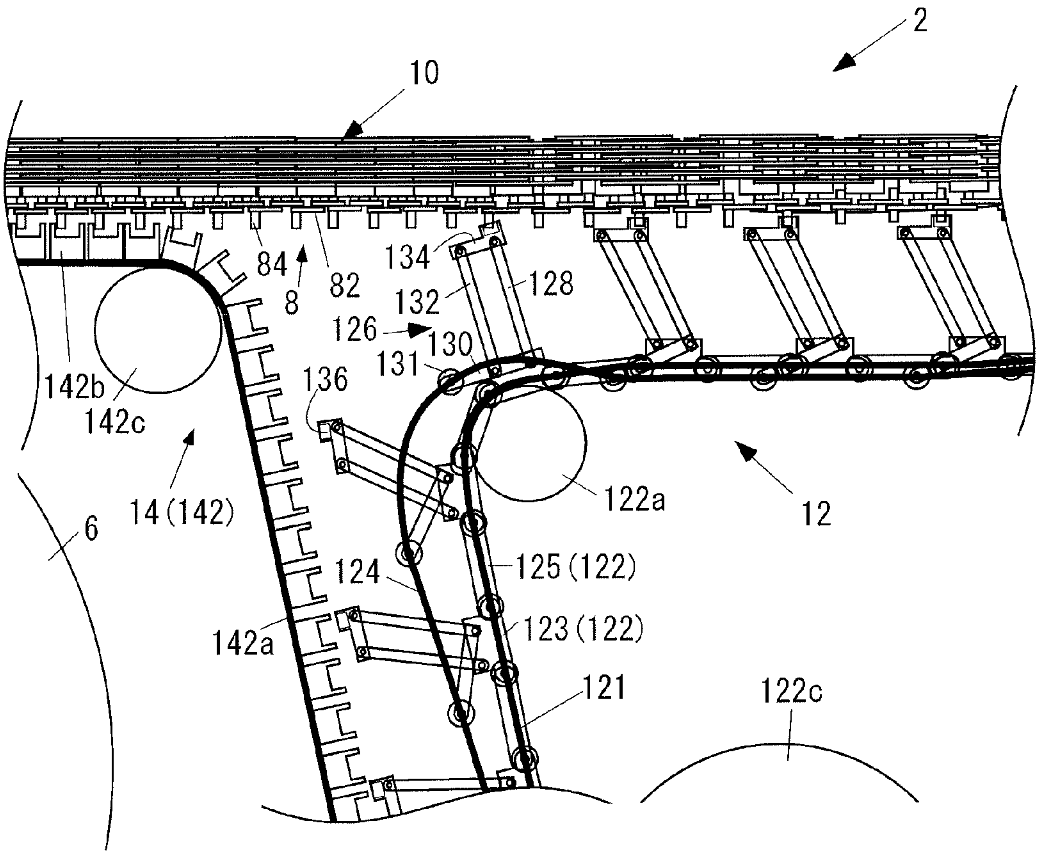
FIG. 3 is a partially enlarged view of the acceleration and deceleration handrail driving device of the present invention.

FIG. 3 is a partially enlarged view of the acceleration and deceleration handrail driving device 2 of the present invention.

Figure 4A:
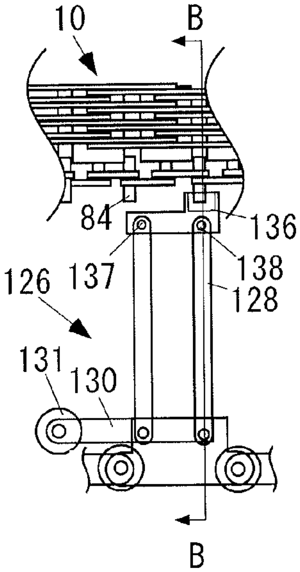
FIG. 4A is a side view of a pressing fitting mechanism of the present invention when a first pressing fitting is perpendicular with respect to a fixing member.
Figure 4B:
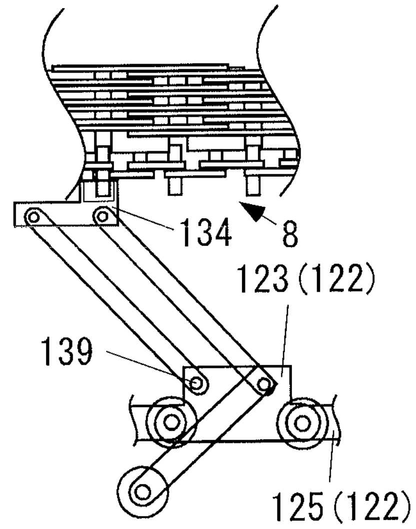
FIG. 4B is a side view of the pressing fitting mechanism of the present invention when the first pressing fitting is inclined with respect to the fixing member in a direction of the second pressing fitting.
Figure 4C:
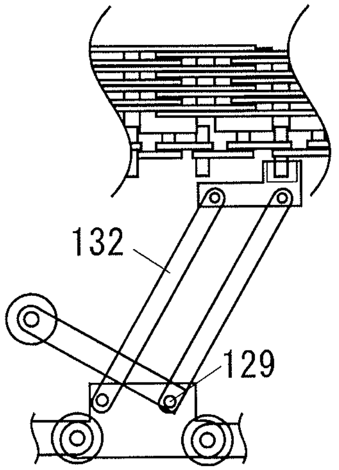
FIG. 4C is a side view of the pressing fitting mechanism of the present invention when the first pressing fitting is inclined opposite to the direction of FIG. 4B.

FIG. 4A is a side view of a pressing fitting mechanism 126 of the present invention when a first pressing fitting 128 is perpendicular with respect to a fixing member 123. FIG. 4B is a side view of the pressing fitting mechanism 126 of the present invention when the first pressing fitting 128 is inclined with respect to the fixing member 123 in a direction of the second pressing fitting. FIG. 4C is a side view of the pressing fitting mechanism 126 of the present invention when the first pressing fitting 128 is inclined opposite to the direction of FIG. 4B.

Hereafter, only one of two handrail devices 2 will be explained.

The present invention is characterized in that in the acceleration and deceleration device 12, as shown in FIG. 4A, FIG. 4B and FIG. 4C, a coupling fitting 134 is provided on a tip of the first pressing fitting 128 and the second pressing fitting 132 so that a traveling track of the coupling fitting 134 can be accelerated and decelerated while smoothly traveling along gradient curve of the handrail.

As shown in FIG. 1B and FIG. 2B, pivots (first concavo-convex engagement members: pivot shafts) 84 of the acceleration and deceleration handrail driving device 2 of the present invention are continuously and endlessly arranged at speed ranges which are sequentially divided into a first low-speed portion, an acceleration portion, a high-speed portion, a deceleration portion, and a second low-speed portion in an advancing direction from a lower step to an upper step.

In addition, as shown in FIG. 3, the handrail device 2 of the present invention has a pair of disk-shaped pulleys 6, an expansion link chain 8, a flexible handrail belt member 10, an acceleration and deceleration device 12, and a constant-speed driving device 14. Furthermore, the acceleration and deceleration device 12 has a first track chain 122, a skip rail 124, and a plurality of pressing fitting mechanisms 126. The first track chain 122 is a chain obtained by alternately connecting fixing members 123 and coupling members 125. The pressing fitting mechanism 126 has a first pressing fitting 128, a swing yoke 130, a second pressing fitting 132 and a coupling fitting (second concavo-convex engagement member) 134. Note that the fixing member 123, the first pressing fitting 128, the second pressing fitting 132, and the coupling fitting 134 form a link mechanism having a parallelogram shape. Furthermore, the expansion link chain 8 is formed by a plurality of expansion links 82 connected in series with each other, and the expansion link chain 8 has the pivots 84.

A pair of the disk-shaped pulleys 6 is provided on each of an entrance side IN and an exit side OUT so as to be rotated around a horizontal shaft. Each of the disk-shaped pulleys 6 is driven by a not illustrated rotation driving device at a peripheral speed same as a moving speed (low speed) of the step of the acceleration and deceleration escalator 4 at the entrance and the exit.

Figure 5:
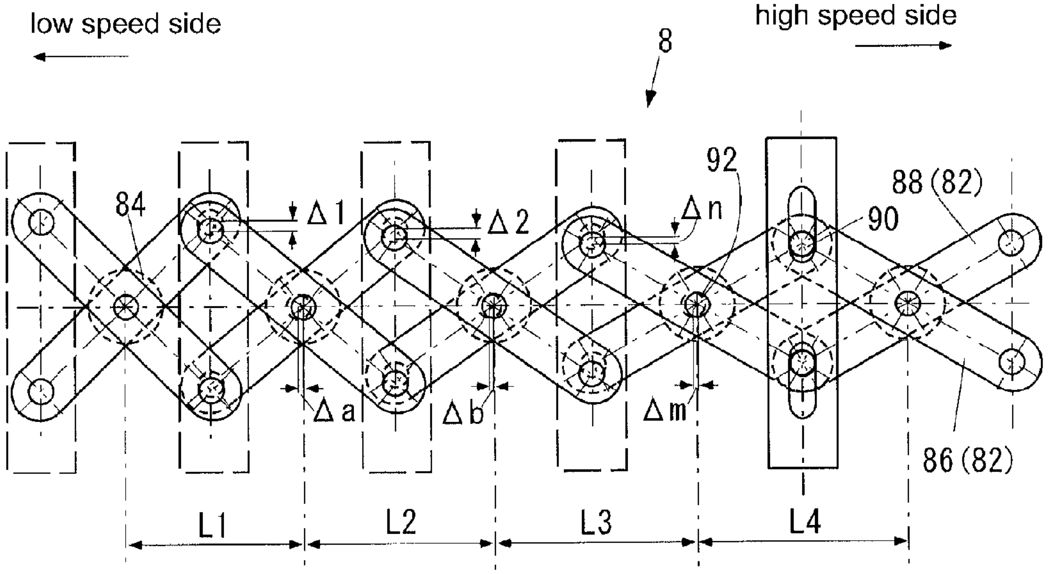
FIG. 5 is an explanatory drawing of an expansion link chain of the present invention.

FIG. 5 is an explanatory drawing of the expansion link chain of the present invention.

Hereafter, with reference to FIG. 1, FIG. 3 and FIG. 5, the expansion link chain 8 of the present invention will be explained.

The expansion link chain 8 is endlessly wound between a pair of the disk-shaped pulleys 6 so as to be rotated between the pulleys 6. Although the disk-shaped pulleys 6 having a large size are arranged on the entrance side IN and the exit side OUT in the present invention, a plurality of small pulleys and curved guide plates can be used instead as long as the expansion link chain 8 is wound and rotated endlessly.

The expansion link chain 8 is formed by a plurality of expansion links 82 connected in series with each other. Each of the expansion links 82 is formed to be flexibly extendable and retractable in a length direction (traveling direction). In addition, each of the expansion links 82 has the pivot 84. The pivot 84 travels in parallel along the flexible handrail belt member 10 and engaged detachably with a tip of the first pressing fitting 128.

In other words, the coupling fittings 134 of the acceleration and deceleration device 12 are engaged with the pivots 84 of the expansion link 82, and lengths L1, L2, L3 and L4 between the pivots 84 are continuously changed in the traveling direction so that the expansion link chain 8 is accelerated or decelerated. The lengths L1, L2, L3 and L4 between the pivots 84 are the shortest at the entrance side IN and the exit side OUT (low speed side) and becomes longer gradually toward the intermediate portion (high speed portion).

The expansion link 82 is formed by a drive link 86, an auxiliary link 88, and an edges-deflecting bushing 90. The drive link 86 and the auxiliary link 88 are same length and are rotatably connected with the pivot 84 at the center. The edges-deflecting bushing 90 rotatably connects an edge of the drive link 86 with an edge of the neighboring auxiliary link 88.

The center of the drive link 86 is formed integrally with the pivot 84 and has a shaft 83. The shaft 83 is extended upward and rotatably connected with the auxiliary link 88 via a center-deflecting bushing 92. The center-deflecting bushing 92 and the edges-deflecting bushing 90 have a deflection amount enough to absorb core misalignments Δ1, Δ2, Δn and Δa, Δb, Δm of connection parts between the drive link 86 and the auxiliary link 88 caused when distances between the pivots 84 are changed or when the expansion links 82 are curved in an arc shape along an outer periphery of the disk-shaped pulleys 6 in the most contracted state.

As described above, the expansion links have a pair of the drive link and the auxiliary link which have substantially same length and are rotatably connected and crossed with each other at the center by the pivot axis via the center-deflecting bushing, the edge of the drive link is rotatably connected with the edge of the neighboring auxiliary link by the edges-deflecting bushing, and the pivot axis is projected toward a side of the first track chain to form the first concavo-convex engagement member. Since the center-deflecting bushing and the edges-deflecting bushing are deflected, the core misalignments of the connection parts between the drive link and the auxiliary link are absorbed.

Figure 6A:
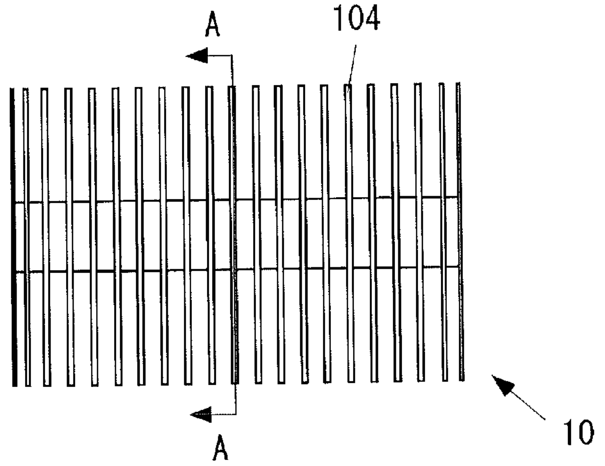
FIG. 6A is an explanatory drawing of a flexible handrail belt member of the present invention when viewed from an upper side.
Figure 6B:
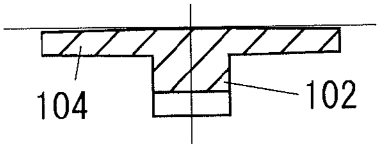
FIG. 6B is a cross-sectional view cut along the A-A line of FIG. 6A.
Figure 6C:
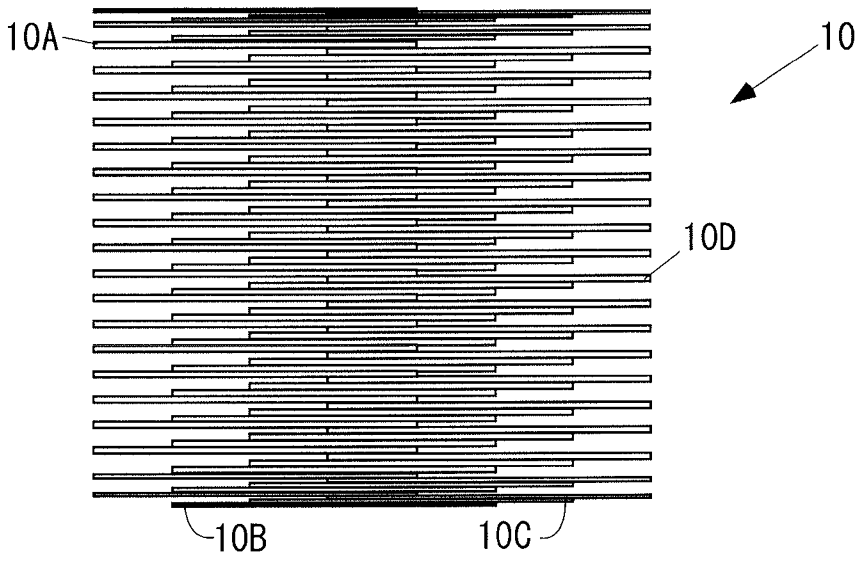
FIG. 6C is an explanatory drawing of comb teeth members when four kinds of flexible handrail belt members are combined and viewed from an upper side.

FIG. 6A is an explanatory drawing of the flexible handrail belt member 10 of the present invention when viewed from an upper side. FIG. 6B is a cross-sectional view cut along the A-A line of FIG. 6A. FIG. 6C is an explanatory drawing of comb teeth members 104 when four kinds of flexible handrail belt members 10A, 10B, 10C and 10D are combined and viewed from an upper side.

A plurality of the comb teeth members 104 are projected forward and backward in the traveling direction. The comb teeth members 104 are integrally molded on upper surfaces of the flexible handrail flat plate members 102 at a center while keeping intervals in a width direction. In addition, the comb teeth members 104 are arranged alternately in the width direction so as not to be overlapped when the neighboring flexible handrail flat plate members 102 approach near to each other. In other words, as shown in FIG. 6C, the flexible handrail belt member 10 is divided into four kinds of the flexible handrail belt members 10A, 10B, 10C and 10D according to the position where the comb teeth members 104 are fixed to the flexible handrail flat plate members 102. The flexible handrail belt member 10 forms a belt shape by combining four kinds of the flexible handrail belt members 10A, 10B, 10C and 10D.

As explained above, the handrail belt member is formed by arranging a plurality of the flexible handrail belt members in the length direction and each of the flexible handrail belt members is formed by the flexible handrail flat plate members and the comb teeth members. The flexible handrail flat plate members are perpendicular to the traveling direction and fixed outside the expansion link chain, and both ends of the flexible handrail flat plate members in the width direction with respect to the traveling direction are curved approaching toward the side of the expansion link chain. The comb teeth members are formed by a plurality of plate members, which are projecting forward and backward in the traveling direction and fixed on the flexible handrail flat plate member at the center in the traveling direction keeping intervals in the width direction. Furthermore, the comb teeth members are arranged alternately in the width direction so as not to be overlapped when the neighboring flexible handrail flat plate members approach near to each other.

In addition, it is preferred that a width in a height direction of the comb teeth members 104 is gradually reduced from the center to the both ends. By adopting the above structure, when the flexible handrail belt member 10 is rotated around the disk-shaped pulleys 6, both ends of the comb teeth members 104 are not projected outside an upper surface of the neighboring comb teeth member 104 and the flexible handrail belt member 10 is kept flat.

Figure 7A:
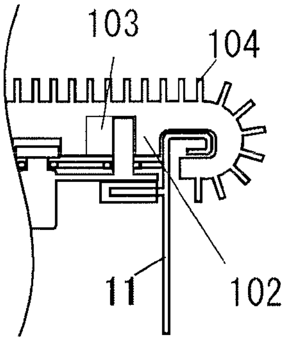
FIG. 7A is a width direction cross-sectional view of the expansion link chain and the flexible handrail belt member of the present invention at a first low-speed portion (entrance) and a second low-speed portion (exit).
Figure 7B:
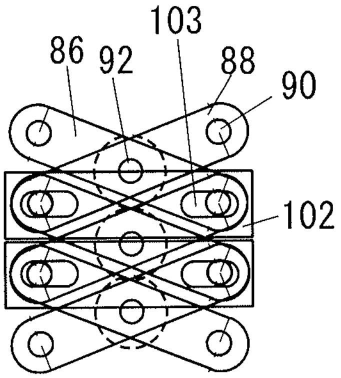
FIG. 7B is an explanatory drawing showing a flexible handrail flat plate member and the expansion link chain of the present invention at the first low-speed portion (entrance) and the second low-speed portion (exit) viewed from an upper side.

FIG. 7A is a width direction cross-sectional view of the expansion link chain 8 and the flexible handrail belt member 10 of the present invention at the first low-speed portion (entrance) and the second low-speed portion (exit). FIG. 7B is an explanatory drawing showing the flexible handrail flat plate member 102 and the expansion link chain 8 of the present invention at the first low-speed portion (entrance) and the second low-speed portion (exit) viewed from an upper side.

Figure 7C:
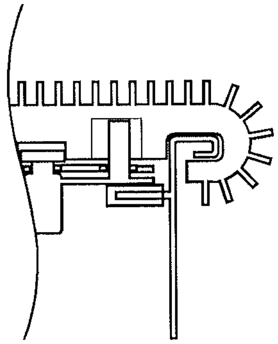
FIG. 7C is a width direction cross-sectional view of the expansion link chain and the flexible handrail belt member of the present invention at an acceleration portion and a deceleration portion.
Figure 7D:
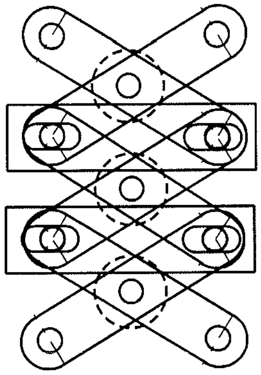
FIG. 7D is an explanatory drawing of the flexible handrail flat plate member and the expansion link chain of the present invention at the acceleration portion and the deceleration portion viewed from an upper side.

FIG. 7C is a width direction cross-sectional view of the expansion link chain 8 and the flexible handrail belt member 10 of the present invention at the acceleration portion and the deceleration portion. FIG. 7D is an explanatory drawing of the flexible handrail flat plate member 102 and the expansion link chain 8 of the present invention at the acceleration portion and the deceleration portion viewed from an upper side.

Figure 7E:
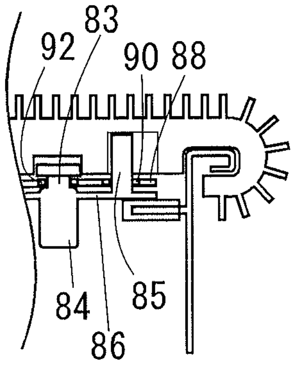
FIG. 7E is a width direction cross-sectional view of the expansion link chain and the flexible handrail belt member of the present invention at a high-speed portion.
Figure 7F:
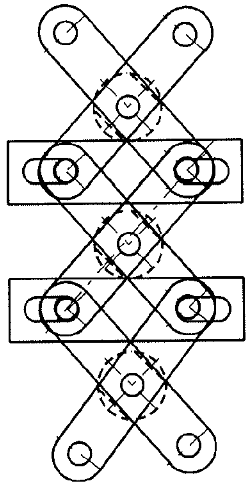
FIG. 7F is an explanatory drawing of the flexible handrail flat plate member and the expansion link chain of the present invention at the high-speed portion viewed from an upper side.

FIG. 7E is a width direction cross-sectional view of the expansion link chain 8 and the flexible handrail belt member 10 of the present invention at a high-speed portion. FIG. 7F is an explanatory drawing of the flexible handrail flat plate member 102 and the expansion link chain 8 of the present invention at the high-speed portion viewed from an upper side.

The flexible handrail belt members 10 are attached outside the expansion link chain 8. Gaps between the flexible handrail belt members 10 are continuously (steplessly) extended and retracted in the traveling direction.

Each of the flexible handrail belt members 10 is formed by integrally molding the flexible handrail flat plate member 102 and a plurality of the comb teeth members 104. The flexible handrail belt members 10 travel while being guided by a flexible handrail belt member running guide frame 11.

The flexible handrail flat plate member 102 is perpendicular to the traveling direction and fixed outside the expansion link chain 8. Both ends of the flexible handrail flat plate member 102 in the width direction with respect to the traveling direction are curved toward a lower surface.

The flexible handrail flat plate member 102 of the present invention has an elongate hole 103 on a lower surface extending in the width direction with respect to the traveling direction. Two driving rod pins 85 extending from the drive link 86 are fit into the elongate hole 103. The driving rod pins 85 can transmit driving force while sliding in the width direction in the elongate hole 103 by expansion and contraction of the expansion link chain 8.

By adopting the above structure, the flexible handrail flat plate member 102 can be always kept to be perpendicular to the traveling direction while allowing the expansion and contraction of the expansion links 82.

Figure 8:
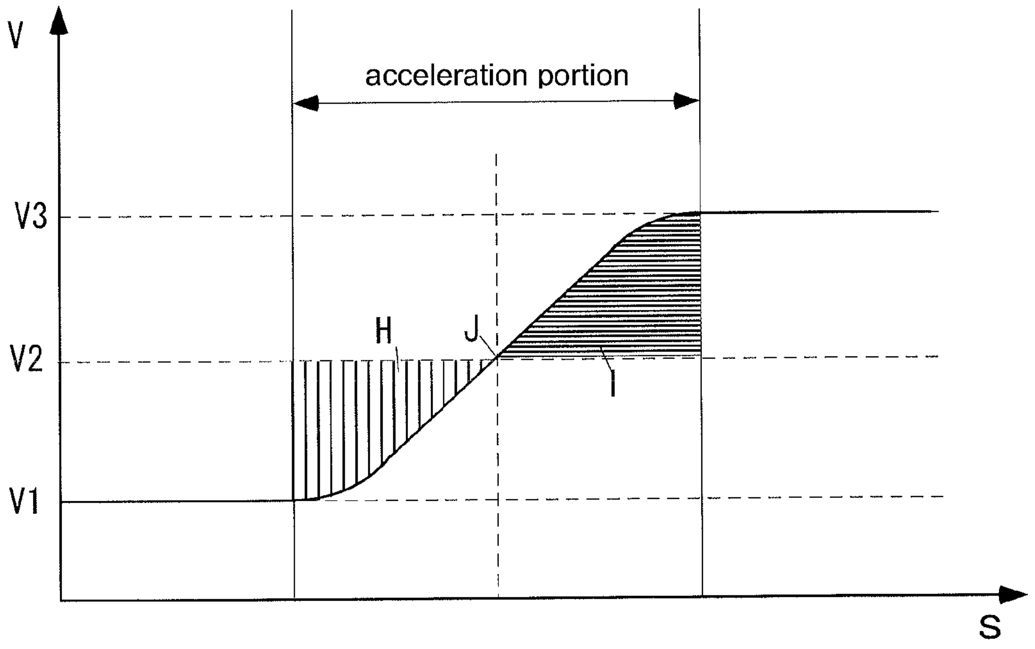
FIG. 8 is an explanatory drawing of an acceleration and deceleration generating mechanism of an acceleration and deceleration device of the present invention.

FIG. 8 is an explanatory drawing of an acceleration and deceleration generating mechanism of the acceleration and deceleration device 12 of the present invention.

Figure 9:
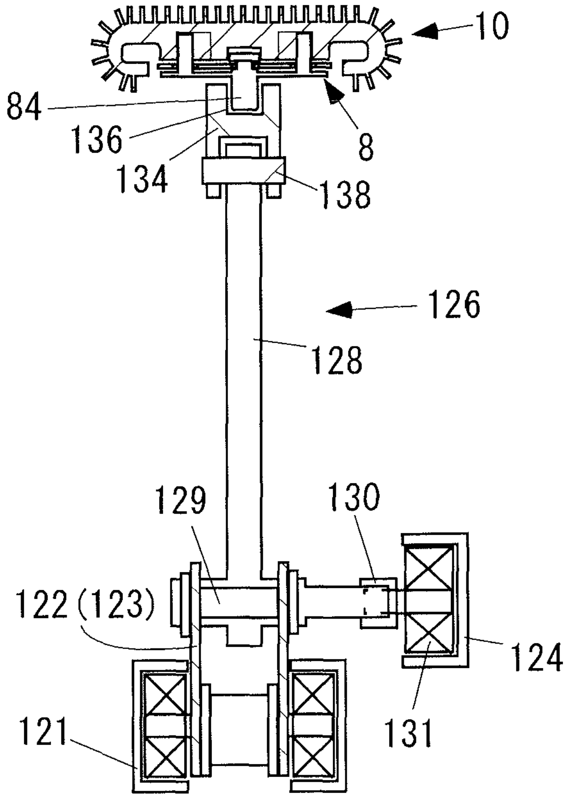
FIG. 9 is a drawing viewed from an arrow B-B of FIG. 4A.

FIG. 9 is a drawing viewed from an arrow B-B of FIG. 4A.

Hereafter, with reference to FIG. 1A, FIG. 1B, FIG. 4A, FIG. 4B, FIG. 4C, FIG. 8 and FIG. 9, the acceleration and deceleration device 12 of the present invention will be explained.

The acceleration and deceleration device 12 accelerates or decelerates the pivots 84. The acceleration and deceleration device 12 is provided at the acceleration portion and the deceleration portion. The acceleration and deceleration device 12 has a traveling rail 121 for first track chain, the first track chain 122, the skip rail 124, and a plurality of the pressing fitting mechanisms 126.

In the acceleration and deceleration device 12 of the present invention, as shown in FIG. 1B, at an entrance of a lower side, an upper side serves as the acceleration device, and a lower side serves as the deceleration device.

The acceleration and deceleration device 12 needs to be smoothly accelerated and decelerated while a difference in speed between a chain speed V1 of the low-speed portion and a chain speed V3 of the high-speed portion is maintained to be constant and a chain speed V2 of the acceleration and deceleration device 12*a* is maintained to be constant. The acceleration and the deceleration of the smooth movement are adjusted by a movement of the first pressing fittings 128.

In other words, as shown in FIG. 8, in the case of the acceleration and deceleration device 12 of the acceleration portion of the ascending escalator, the first pressing fitting 128 is inclined in the direction opposite to the traveling direction (deceleration operation range H) and the speed of the pivot 84 is gradually increased from V1 to V2 until the speed of the pivot 84 becomes equal to the chain speed V2. Then, at the downstream (acceleration operation range I) from the point (J-point) where the difference between the speed of the pivot 84 and the chain speed V2 becomes 0, the first pressing fitting 128 is inclined in the same direction as the traveling direction of the pivot 84 and the speed of the pivot 84 is accelerated to V3.

During the reversing operation, although the function of the acceleration and deceleration device is reversely switched and served as the deceleration device, the deceleration operation is same as above.

The first track chain 122 is a chain formed by alternately connecting the fixing members 123 to which the pressing fitting mechanism 126 is connected and the coupling members 125 to connect the neighboring fixing members 123. The first track chain 122 is endlessly guided along a predetermined first track and rotated at the chain speed V2 of the acceleration portion and the deceleration portion. In other words, the first track chain 122 is guided on the traveling rail 121 for first track chain by three sprockets 122*a*, 122*b* and 122*c* which are rotated at a predetermined chain speed V2 of the acceleration portion and the deceleration portion so as to be rotated along the first track.

The pressing fitting mechanism 126 has a first pressing fitting 128, a coupling shaft 129, a swing yoke 130, a second pressing fitting 132, and a coupling fitting 134.

The first pressing fitting 128 is a bar-shaped metal fitting extending outwards, and an end of the first pressing fitting 128 is swingably attached to the first track chain 122.

In other words, the end of the first pressing fitting 128 is firmly connected and fixed to the coupling shaft 129 which extends in the width direction of the handrail device 2. In addition, the end of the first pressing fitting 128 is swingably attached to the fixing members 123 by making an end of the coupling shaft 129 rotatably pass through the fixing members 123 of the first track chain 122. Further, the swing yoke 130 is connected and fixed at an end of the coupling shaft 129 while crossing the first pressing fitting 128.

Furthermore, the coupling fitting 134 is provided at a tip of the first pressing fitting 128 so as to be detachably engaged with the pivot 84. As a result, the first pressing fitting 128 and the swing yoke 130 are integrally rotated around the coupling shaft 129.

At the other end of the swing yoke 130, a skip roller 131 is rotatably provided. The first pressing fitting 128 is rotated along the first track while changing a swing angle in accordance with a change in distance and positional relation between the traveling rail 121 for first track chain and the skip rail 124. As a result, the acceleration and deceleration device 12 can continuously accelerate and decelerate the speed in the traveling direction of the expansion link chain 8 without a shock by continuously changing the distance between the pivots 84.

As explained above, the acceleration and deceleration device has: the second pressing fitting that is swingably connected to the first track chain and has a substantially same length as the first pressing fitting; a coupling fitting that swingably connects end portions of the first pressing fitting and the second pressing fitting with each other so as to form a link mechanism having a parallelogram shape and has the second concavo-convex engagement member; a swing yoke that is relatively fixed at one end to a rotation axis on which the first pressing fitting is swingably connected with respect to the first track chain; and a skip rail that guides other end of the swing yoke along a predetermined second track.

In addition, the second track of the skip rail is formed so that the first pressing fitting is swung in the predetermined direction within the predetermined angle range when the other end of the first pressing fitting is driven by the first track chain at the constant speed, and the second concavo-convex engagement member drives the expansion link chain via the first concavo-convex engagement member at the moving speed of the second concavo-convex engagement member from when the second concavo-convex engagement member is engaged with the first concavo-convex engagement member by following the arc trajectory to approach to the expansion link chain until the second concavo-convex engagement member is released from the expansion link chain by further following the arc trajectory to separate from the expansion link chain.

Note that the pivots 84 are continued to form the expansion link chain 8 and therefore a predetermined driving force of the acceleration and deceleration portion can be maintained by the longitudinally connected pivots 84 even if a part of the pivots 84 is not engaged with the coupling fitting 134. Therefore, all of the pivot 84 which are arranged at the acceleration portion and the deceleration portion are not necessarily engaged with the coupling fitting 134 provided on the tip of the first pressing fitting 128. In the present example, as shown in FIG. 1, FIG. 2 and FIG. 3, the pivots 84 are engaged with the coupling fitting 134 provided on the tip of the first pressing fitting 128 at every three pivots.

However, without limited to that, the pivot 84 can be engaged with the coupling fitting 134 at every four or more pivots.

An end of the second pressing fitting 132 is swingably attached to the fixing member 123 of the first track chain 122 so as to be swung at the same pitch as the first pressing fitting 128 and in parallel with the first pressing fitting 128. In other words, the end of the second pressing fitting 132 is swingably attached to a lower pin 139, which extends in parallel with the coupling shaft 129 and is fixed to the fixing members 123 at both ends.

In addition, the coupling fitting 134 connects the tip of the first pressing fitting 128 and the tip of the second pressing fitting 132 by pins 137, 138, and has recesses 136 on an upper surface so as to detachably fit the pivots 84. Hereafter, "fit" is referred to as "fitting connection".

In other words, the fixing members 123, the first pressing fitting 128, the second pressing fitting 132 and the coupling fitting 134 form a link mechanism and the link mechanism changes an inclination of the first pressing fitting 128 and the second pressing fitting 132 by changing an inclination of the swing yoke 130. Therefore, the acceleration and deceleration device 12 can generate the driving force at right angle to the pivots 84 by the link mechanism of the pressing fitting mechanism 126.

The skip rail 124 guides the skip roller 131 attached on the other end of the swing yoke 130 along a predetermined second track. Then, the swing angle of the first pressing fitting 128 is changed by changing the distance and the positional relation between the first track and the second track, and the acceleration and deceleration device 12 accelerates and decelerates the pivots 84 by adjusting the acceleration and deceleration, which are obtained by continuously changing the distance between the pivots 84 by the coupling fitting 134, to the speed V2 of the first track chain.

As described above, in the acceleration and deceleration handrail driving device of the present embodiment, a looped handrail is endlessly wound between an entrance side and an exit side so that the handrail is driven in a predetermined direction, and the acceleration and deceleration handrail driving device has pulleys arranged on each of the entrance side and the exit side; a looped expansion link chain that is wound between the pulleys of the entrance side and the exit side and formed by connecting a plurality of expansion links, which are flexibly extendable and retractable within a predetermined range in a length direction; a handrail belt member that is connected with the expansion link chain and continuously extendable and retractable in the length direction of the expansion link chain; and an acceleration and deceleration device that accelerates and decelerates the expansion link chain along the length direction of the expansion link chain via a second concavo-convex engagement member, which can be engaged with the first concavo-convex engagement member.

Furthermore, the acceleration and deceleration device has: a first track chain that is driven at a constant speed along a first track, which follows substantially same trajectory as the expansion link chain in a predetermined section of the expansion link chain while being spaced a constant distance from the expansion link chain; and a first pressing fitting that has the second concavo-convex engagement member at one end and is swingably attached to the first track chain at other end.

Therefore, the first pressing fitting is swung in a predetermined direction within a predetermined angle range when the other end of the first pressing fitting is driven by the first track chain at the constant speed, and the second concavo-convex engagement member drives the expansion link chain via the first concavo-convex engagement member at a moving speed of the second concavo-convex engagement member from when the second concavo-convex engagement member is engaged with the first concavo-convex engagement member by following an arc trajectory to approach to the expansion link chain until the second concavo-convex engagement member is released from the expansion link chain by further following the arc trajectory to separate from the expansion link chain.

Furthermore, the acceleration and deceleration device, in the first track, accelerates the first concavo-convex engagement member by the second concavo-convex engagement member when rotating the expansion link chain from a rear side to a front side along a traveling direction of the first track chain, and decelerates the first concavo-convex engagement member by the second concavo-convex engagement member when rotating the expansion link chain from the front side to the rear side along the traveling direction of the first track chain.

The constant-speed driving device 14 drives the pivots 84 at a constant speed of the low-speed or the high-speed.

In other words, the constant-speed driving device 14 drives the pivots 84 at a predetermined first low-speed on the first low-speed portion, at a predetermined high-speed on the high-speed portion, and at a predetermined second low-speed on the second low-speed portion.

As described above, the expansion link chain is divided into speed ranges of a first low-speed portion, an acceleration portion, a high-speed portion, a deceleration portion, and a second low-speed portion between the entrance side and the exit side, the acceleration and deceleration device is arranged on each of the acceleration portion and the deceleration portion, and a plurality of independent constant-speed driving devices are provided so as to drive the expansion link chain at a predetermined first low-speed on the first low-speed portion, at a predetermined high-speed on the high-speed portion, and at a predetermined second low-speed on the second low-speed portion.

With reference to FIG. 2B, the acceleration and deceleration device 12 will be further explained.

As shown in the figure, the constant-speed driving device 14 is formed by a low-speed chain driving device 142 which drives the pivots 84 of the first low-speed portion and the second low-speed portion at a predetermined first low-speed, and a high-speed chain driving device 144 which drives the pivots 84 of the high-speed portion at the high speed.

Also in the figure, since the pivots 84 are engaged with the tip of the first pressing fitting 128 of the acceleration and deceleration device 12 at every three pivots, "P1" is corresponding to a pitch of a drive attachment 142*b* of a first low-speed chain driving device 142, "P2" is corresponding to a pitch of the first pressing fitting 128 of the acceleration and deceleration device 12, "P3" is a pitch of a drive attachment 144*b* of the high-speed chain driving device 144, and the pitches satisfies the following relation: P3>(P2)/3>P1.

In the acceleration and deceleration device 12, the upper side of the acceleration portion which comes into contact with the pivots 84 accelerates the pivots 84 from the first low-speed V1 to the high speed V3 faster than the first low speed, and the side of the deceleration portion which comes into contact with the pivots 84 decelerates the pivots 84 from the high-speed V3 to a predetermined second low-speed V1 slower than the high speed. In addition, lengths of the respective chains are set to be an integer number of times of the component attachment pitches P1, P2 and P3 of the respective chains.

In the respective chain driving devices of the driving device of the constant-speed driving device 14 and the respective chain driving devices of the acceleration and deceleration device 12, different chains are driven in the respective regions.

The chain speed is V1 at the first low-speed portion (entrance), V2 at the acceleration portion, V3 at the high-speed portion, V2 at the deceleration portion, and V1 at the second low-speed portion (exit). The value of the speed V1 is same at the entrance and the exit in this example, but may be different.

One low-speed chain driving device 142 is installed at one side of the first low-speed portion of the lower step of the handrail device 2.

The low-speed chain driving device 142 has a chain 142*a* which is endlessly rotated, a plurality of drive attachments 142*b* which are attached to the chain 142*a* at a constant pitch P1 and are fitted to the pivots 84 positioned at the first low-speed portion, and two sprockets 142*c*, 142*d* which is meshed with the chain 142*a* and rotated at a constant low speed V1.

In other words, as shown in FIG. 1B and FIG. 2B, the chain 142*a* of the low-speed chain driving device 142 is endlessly wound around the disk-shaped pulley 6 and two sprockets 142*c*, 142*d*, and rotated at the low speed V1.

Then, a plurality of the pivots 84 which are positioned at the upper and lower sides of the first low-speed portion of the lower step are horizontally driven at the constant low speed V1.

The low-speed chain driving device 142 of the second low-speed portion has a configuration in which the low-speed chain of the first low-speed portion is installed while being reversed in the vertical direction. One low-speed chain driving device is installed at the second low-speed portion of the upper step of the handrail device 2.

One high-speed chain driving device 144 is installed at one side of the high-speed portion of the handrail device 2. The high-speed chain driving device 144 has a chain 144_a_ which is endlessly rotated with a constant slope, a plurality of drive attachments 144_b_ which are attached to the chain 144_a_ at a constant pitch P3 and are fitted to the pivots 84 positioned at the high-speed portion, and four sprockets 144_c_, 144_d_, 144_e_ and 144_f_ which are meshed with the chain 144_a_ and rotated at a constant high speed V3. Then, the plurality of pivots 84 positioned at the upper and lower high-speed portions are driven at the constant high speed V3 with the constant slope.

In the acceleration and deceleration device 12 of the acceleration portion, the upper side serves as the acceleration device, and the lower side serves as the deceleration device. One acceleration and deceleration device 12 is installed at one side of the acceleration portion of the handrail device 2 so that the side serving as the acceleration device is directed upward. Then, one acceleration and deceleration device is installed at one side of the deceleration portion of the handrail device 2 so that the side serving as the deceleration device is directed upward. In the acceleration portion, the upper side of the acceleration and deceleration device 12 has a function of accelerating the moving speed of the pivots 84 from the low speed of the first low-speed portion to the high speed of the high-speed portion. On the contrary, in the deceleration portion, the lower side of the acceleration and deceleration device 12 decelerates the moving speed of the pivots 84 from the high speed of the high-speed portion to the low speed of the second low-speed portion.

Furthermore, in a case where the acceleration and deceleration handrail driving device 2 of the present invention is used for a descending purpose, the chain of the acceleration and deceleration device 12 is reversely rotated.

The pitch of the fitting connection of the pivots 84 of downstream side of the acceleration region and upstream side of the deceleration region is same as three times a pitch of the pivots 84 of a high-speed traveling portion when the pivots 84 are engaged with the tip of the first pressing fitting 128 of the acceleration and deceleration device 12 at every three pivots. Hereafter, the pitch of the pivots 84 of the high-speed traveling portion is referred to as "drive attachment mounting pitch P3". Similarly, the pitch of the fitting connection of the pivots 84 of upstream side of the acceleration region and downstream side of the deceleration region is same as three times a pitch of the pivots 84 of a low-speed traveling portion. Hereafter, the pitch of the pivots 84 of the low-speed traveling portion is referred to as "drive attachment mounting pitch P1".

Furthermore, the chain speed V2 of the first track chain 122 is a constant speed which is faster than the chain speed V1 in accordance with a length ratio between one third of the attachment pitch P2 of the first pressing fitting 128 and the shortest pitch P1 of the pivots 84. In other words, the chain speed V2 of the acceleration portion and the deceleration portion can be expressed by a formula (1).

$$V2=V1\times[((P2)/3)/P1] \tag{1}$$

With the above-described configuration of the acceleration and deceleration device 12, the pivots 84 moved from the first low-speed portion are engaged with the recess 136 of the coupling fitting 134 and accelerated by the speed V2 of the first track chain 122 and a change in posture of the first pressing fitting 128, and then the pivots 84 are transmitted to the high-speed chain driving device 144 between the acceleration portion and the high-speed portion. Consequently, the moving speed of the pivots 84 can be accelerated from the low speed of the first low-speed portion to the high speed of the high-speed portion.

Note that the acceleration and deceleration device 12 can be installed as the deceleration device by installing the deceleration portion so as to be reversed in the vertical direction.

Furthermore, in the acceleration and deceleration handrail driving device 2 of the present invention, the trajectory which is drawn by the expansion link chain 8 and the first and second tracks are set as described in FIG. 1 and FIG. 2. However, these tracks may be, of course, changed into a linear shape or a horizontal curved shape depending on the use purpose of the acceleration and deceleration device 12.

Furthermore, when the acceleration and deceleration devices 12 are arranged in series, from the operation principle thereof, greater acceleration and deceleration can be obtained and acceleration and deceleration area can be lengthened so that the acceleration and deceleration devices are fit for the application field.

With the above-described configuration of the present invention, the pivots 84 are accelerated and decelerated by continuously changing the distance between the pivots 84 by the change of swing angle of the first pressing fittings 128 with respect to the pivots 84. Therefore, the first pressing fittings 128 are rotated along the first track changing the swing direction with respect to the pivots 84 so as to continuously change the distance between the pivots 84. Consequently, the expansion link chain 8 can be continuously accelerated and decelerated in the traveling direction without a shock.

In addition, the above-described configuration can be applied to the acceleration and deceleration escalator 4 because the acceleration and deceleration device 12 which accelerates and decelerates the pivots 84 is included.

In addition, the above-described configuration can be also used for a curved track because the acceleration and deceleration device 12 continuously changes the distance between the pivots 84 by the change of the swing angle of the inclination of the first pressing fitting 128 with respect to the pivots 84 so as to accelerate and decelerate the pivots 84.

Furthermore, the invention is not limited to the above-described embodiments and may be, of course, modified into various forms without departing from the spirit of the invention.

What is claimed is:

1. An acceleration and deceleration handrail driving device in which a looped handrail is endlessly wound between an entrance side and an exit side so that the handrail is driven in a predetermined direction comprising:

pulleys arranged on each of the entrance side and the exit side;

a looped expansion link chain that is wound between the pulleys of the entrance side and the exit side and formed by connecting a plurality of expansion links, which are flexibly extendable and retractable within a predetermined range in a length direction; and a handrail belt member that is connected with the expansion link chain and continuously extendable and retractable in the length direction of the expansion link chain; wherein the expansion links of the expansion link chain have a first concavo-convex engagement member which is engageable and releasable with a second concavo-convex engagement member by approaching and separating to/from the second concavo-convex engagement member in a direction substantially perpendicular to the length direction, an acceleration and deceleration device is provided so as to accelerate and decelerate the expansion link chain along the length direction of the expansion link chain via the second concavo-convex engagement member, the acceleration and deceleration device has:

a first track chain that is driven at a constant speed along a first track, which follows substantially same trajectory as the expansion link chain in a predetermined section of the expansion link chain while being spaced a constant distance from the expansion link chain; and a first pressing fitting that has the second concavo-convex engagement member at one end and is swingably attached to the first track chain at other end, and the first pressing fitting is swung in a predetermined direction within a predetermined angle range when the other end of the first pressing fitting is driven by the first track chain at the constant speed, and the second concavo-convex engagement member drives the expansion link chain via the first concavo-convex engagement member at a moving speed of the second concavo-convex engagement member from when the second concavo-convex engagement member is engaged with the first concavo-convex engagement member by following an arc trajectory to approach to the expansion link chain until the second concavo-convex engagement member is released from the expansion link chain by further following the arc trajectory to separate from the expansion link chain.

2. The acceleration and deceleration handrail driving device according to claim 1, wherein the acceleration and deceleration device, in the first track, accelerates the first concavo-convex engagement member by the second concavo-convex engagement member when rotating the expansion link chain from a rear side to a front side along a traveling direction of the first track chain, and decelerates the first concavo-convex engagement member by the second concavo-convex engagement member when rotating the expansion link chain from the front side to the rear side along the traveling direction of the first track chain.

3. The acceleration and deceleration handrail driving device according to claim 1, wherein the acceleration and deceleration device has a second pressing fitting that is swingably connected to the first track chain and has a substantially same length as the first pressing fitting;

a coupling fitting that swingably connects end portions of the first pressing fitting and the second pressing fitting with each other so as to form a link mechanism having a parallelogram shape, and has the second concavo-convex engagement member;

a swing yoke that is relatively fixed at one end to a rotation axis on which the first pressing fitting is swingably connected with respect to the first track chain; and a skip rail that guides other end of the swing yoke along a predetermined second track, and the second track of the skip rail is formed so that the first pressing fitting is swung in the predetermined direction within the predetermined angle range when the other end of the first pressing fitting is driven by the first track chain at the constant speed, and the second concavo-convex engagement member drives the expansion link chain via the first concavo-convex engagement member at the moving speed of the second concavo-convex engagement member from when the second concavo-convex engagement member is engaged with the first concavo-convex engagement member by following the arc trajectory to approach to the expansion link chain until the second concavo-convex engagement member is released from the expansion link chain by further following the arc trajectory to separate from the expansion link chain.

4. The acceleration and deceleration handrail driving device according to claim 1, wherein each of the expansion links has a pair of a drive link and an auxiliary link that have substantially same length and are rotatably connected and crossed with each other at a center by a pivot axis via a center-deflecting bushing, edges of neighboring the drive link and the auxiliary link are rotatably connected with each other by an edges-deflecting bushing, the pivot axis is projected toward a side of the first track chain to form the first concavo-convex engagement member, and the center-deflecting bushing and the edges-deflecting bushing are deflected to absorb core misalignment of a connection part between the drive link and the auxiliary link.

5. The acceleration and deceleration handrail driving device according to claim 1, wherein the handrail belt member is formed by arranging a plurality of flexible handrail belt members in the length direction, each of the flexible handrail belt members has:

flexible handrail flat plate members that are perpendicular to the traveling direction and fixed outside the expansion link chain so that both ends in a width direction with respect to the traveling direction are curved to approach toward a side of the expansion link chain; and comb teeth members formed by a plurality of plate members, which are projecting forward and backward with respect to the traveling direction and fixed on the flexible handrail flat plate member at a center in the traveling direction of the comb teeth member keeping intervals in a width direction of the flexible handrail flat plate members, and the comb teeth members are arranged alternately in the width direction so as not to be overlapped when the neighboring flexible handrail flat plate members approach near to each other.

6. The acceleration and deceleration handrail driving device according to claim 1, wherein the expansion link chain is divided into speed ranges of a first low-speed portion, an acceleration portion, a high-speed portion, a deceleration portion, and a second low-speed portion between the entrance side and the exit side, the acceleration and deceleration device is arranged on each of the acceleration portion and the deceleration portion, and a plurality of independent constant-speed driving devices are provided so as to drive the expansion link chain at a predetermined first low-speed on the first low-speed portion, at a predetermined high-speed on the high-speed portion, and at a predetermined second low-speed on the second low-speed portion.

* * * * *